(12) United States Patent
Dobrowolski et al.

(10) Patent No.: US 10,840,708 B2
(45) Date of Patent: Nov. 17, 2020

(54) METHOD FOR CONTROLLING A MICROGRID

(71) Applicant: Schneider Electric Industries SAS, Rueil-Malmaison (FR)

(72) Inventors: Jean Dobrowolski, Sassenage (FR); David Gualino, Saint Ismier (FR); Mazen Alamir, Saint Martin d'Heres (FR); Seddik Bacha, Eybens (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 16/193,607

(22) Filed: Nov. 16, 2018

(65) Prior Publication Data

US 2019/0157876 A1 May 23, 2019

(30) Foreign Application Priority Data

Nov. 21, 2017 (EP) .................................. 17306616

(51) Int. Cl.
| | |
|---|---|
| *H02J 3/46* | (2006.01) |
| *H02J 3/32* | (2006.01) |
| *H02J 3/38* | (2006.01) |
| *H02J 3/48* | (2006.01) |
| *G05B 17/02* | (2006.01) |

(Continued)

(52) U.S. Cl.
CPC ............... *H02J 3/46* (2013.01); *G05B 17/02* (2013.01); *H02J 3/32* (2013.01); *H02J 3/381* (2013.01); *H02J 3/382* (2013.01); *H02J 3/48* (2013.01); *H02J 7/0068* (2013.01); *H02J 3/003* (2020.01)

(58) Field of Classification Search
None
See application file for complete search history.

(56) References Cited

U.S. PATENT DOCUMENTS

| | | | | |
|---|---|---|---|---|
| 9,742,189 | B2* | 8/2017 | Watanabe | ................ H02J 3/00 |
| 10,135,251 | B2* | 11/2018 | Berard | ...................... H02J 3/24 |

(Continued)

OTHER PUBLICATIONS

Extended European Search Report dated May 29, 2018 in European application 17306616.8, filed on Nov. 21, 2017 (with English Translation of Categories Cited & Written Opinion).

(Continued)

*Primary Examiner* — Jason Lin
(74) *Attorney, Agent, or Firm* — Oblon, McClelland, Maier & Neustadt, L.L.P.

(57) ABSTRACT

A method controls a microgrid having at least one renewable plant of distributed renewable energy resources and at least one generator plant of distributed non-renewable energy resources, and each plant has a local controller. The method includes providing type and power size of each plant to each local controller. At each local controller, measuring the frequency and estimating the total power load demanded based on the measured frequency. At the local renewable controller, decreasing the frequency at which power is supplied when the supplied power falls below the estimated power load and increasing the frequency when the supplied power exceeds the estimated power load. And at the local generator controller, increasing power supply in response to detecting a decrease in frequency, and decreasing power supply in response to detecting an increase in frequency.

10 Claims, 5 Drawing Sheets

(51) Int. Cl.
*H02J 7/00* (2006.01)
*H02J 3/00* (2006.01)

(56) References Cited

U.S. PATENT DOCUMENTS

| | | | | |
|---|---|---|---|---|
| 2007/0246943 | A1* | 10/2007 | Chang | H02J 3/28 290/44 |
| 2013/0166084 | A1* | 6/2013 | Sedighy | G06Q 50/06 700/291 |
| 2014/0297051 | A1* | 10/2014 | Zhang | G05B 15/02 700/287 |
| 2016/0252015 | A1* | 9/2016 | Kusumi | F03D 9/00 290/40 B |
| 2016/0329713 | A1* | 11/2016 | Berard | H02J 3/24 |
| 2017/0063127 | A1* | 3/2017 | Shelton | H02J 7/022 |
| 2017/0070055 | A1* | 3/2017 | Bamberger | H02J 3/386 |
| 2017/0187188 | A1 | 6/2017 | Aubert Guyon et al. | |
| 2019/0072070 | A1* | 3/2019 | Wang | F03D 7/0284 |
| 2019/0207391 | A1* | 7/2019 | Fazeli | H02J 3/16 |

OTHER PUBLICATIONS

Torres, M. et al. "Virtual Synchronous Generator: A Control Strategy to Improve Dynamic Frequency Control in Autonomous Power Systems," Energy and Power Engineering, vol. 05, No. 02, 2013, pp. 8.

Datta, M. et al. "A Frequency Control Method for Isolated Photovoltaic-diesel Hybrid Power System with Use of Full Renewable Energy", Power Electronics and Drive Systems, 2009. PEDS 2009, International Conference on, IEEE, 2009, pp. 6.

Hisham, M. et al. "Strategies for Independent Deployment and Autonomous Control of PV and Battery Units in Islanded Microgrids", IEEE Journal of Emerging and Selected Topics in Power Electronics, IEEE, vol. 3, No. 3, 2015, pp. 14.

Sina, P. et al. "State of the Art in Research on Microgrids: A Review", IEEE Access, vol. 3, 2015, pp. 36.

* cited by examiner

METHOD FOR CONTROLLING A MICROGRID

The present invention relates to the field of microgrids for the generation and distribution of electricity. More particularly, the invention relates to a method for providing control over distributed energy resources, and a system of distributed energy resources.

BACKGROUND

A microgrid is generally a local electrical grid intended to generate and distribute electrical power in regions that are isolated and far from large electrical energy generation centres. Isolated regions are, for example, islands, mountainous regions or desert areas. The microgrid principle is also applicable when a building, neighbourhood, campus or other entity connected to a wide distribution grid wishes to manage the generation of its energy differently and increase its capacity for resilience.

Microgrids are made up of various kind of energy resources that are spatially distributed and disconnected from a main grid. Such microgrids are set up as autonomous islands for energy supply. These distributed resources may include renewable energy resources, such as photovoltaic cells, solar panels and wind turbines. They further may include engine-generator energy resources, such as fuel consuming engines or turbines. And they may comprise energy storage facilities for locally storing energy, which may include chemical type storage such as batteries or mechanical type storage such as flywheels.

The main advantage of microgrids is that they operate autonomously, i.e. in island mode, without connection to the public grid, and are located in proximity to the areas of consumption, the loads. Thus, the losses inherent to long-distance distribution grids are limited.

The energy autonomy of the microgrid is provided for by the various types of electrical power sources, of which generator sets play an important role, which may also be referred to as synchronous power sources. Specifically, from an economic point of view, a generator set represents a small initial investment and provides for electricity generation that is flexible enough to absorb spikes in consumption at peak times. However, their operation requires large quantities of diesel fuel, which consequently increases the energy bill as well as adding to atmospheric pollution.

In a microgrid, the inverters of renewable energy resources may be set up as Virtual Generator set. As traditional engine powered generators run synchronously providing energy supply with a constant frequency, integrating renewable energy resources to the same (micro)-grid is alleviated by controlling the renewable energy inverters as to emulate characteristics and behavior of traditional synchronous generators. To further increase the degree of penetration of renewable resources, US patent application 2017/0235322 A1 describes a method for controlling Virtual Generator sets to improve the match between the electrical power generated by the renewable set and the electrical power consumed by the loads, while avoiding negatively affecting the stability of the microgrid. In addition, US patent application 2017/0187188 A1 describes a method for coordinating energy generation between a renewable energy resource and a synchronous engine energy resource by adjusting droop control characteristics.

These methods allow a renewable plant, i.e. the plant of renewable energy resources, to become grid-forming. To be grid forming is understood as meaning generating an AC voltage of well defined frequency and amplitude which are either constant or follow a droop curve.

Figure 1:
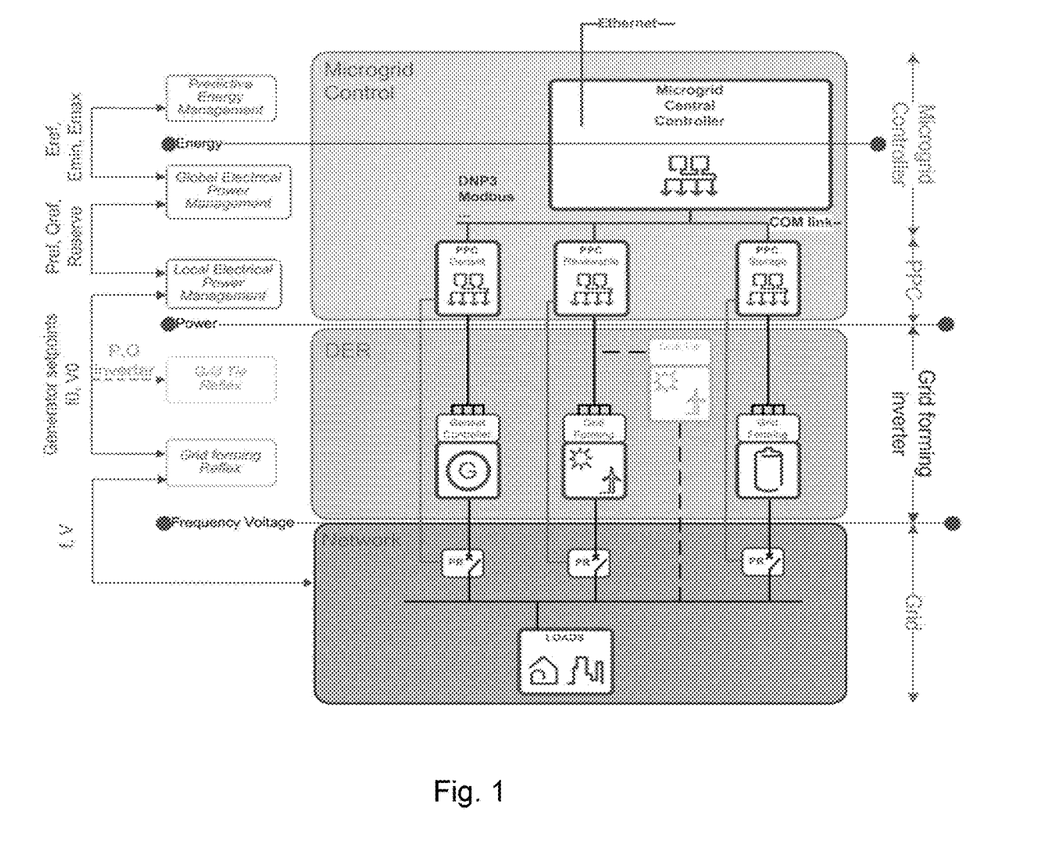
FIG. 1 illustrates schematically an example of a microgrid as known.

An illustrative example of a microgrid is shown schematically in FIG. 1. The microgrid may functionally be split into a resource plane, a network plane and a control plane. The resource plane includes the distributed energy resources of renewable, generator and storage resources. In turn, each of the different types of energy resources may be collectively organized in distinct plants, such as a renewable plant, a generator set plant and a storage plant. The network plane includes the distribution network and loads to which energy is supplied. The control plane includes the local controllers for each plant of energy resource types and an overall microgrid central controller for centrally controlling the coordination between the different energy plants. The above referred methods that allow a renewable set to become grid forming are implemented by the local set controllers and the central controller of the microgrid.

However, within such a microgrid set up, communication between the local controllers of the sets of distributed resources and between the local controllers and central controller may not always be available, reliable or possible, whether temporarily or not. Such hampered communication or lack thereof influences the operational control within the microgrid.

SUMMARY OF INVENTION

It is an object of the invention to provide a method for controlling a microgrid in a decentralized manner.

According to the invention, this object is achieved by providing a method for controlling a microgrid having at least one renewable plant of distributed renewable energy resources and at least one generator plant of distributed non-renewable energy resources, wherein each plant has a local controller.

The method comprising, providing type and power size of each plant to the local controller of each other plant. At each local controller, measuring the frequency of the microgrid and estimating the total power load demanded from both the renewable and non-renewable resources based on the measured frequency. The local controller of the at least one renewable plant: decreasing the frequency at which power is supplied by the renewable plant when the supplied power falls below the estimated power load and increasing the frequency at which power is supplied by the renewable resource when the supplied power exceeds the estimated power load. And the local controller of the at least one generator plant: increasing power supply by non-renewable resources in response to detecting a decrease in frequency; and decreasing power supply by non-renewable resources in response to detecting an increase in frequency.

According to one aspect, there is further provided a microgrid of distributed energy resources that may be controlled in a decentralized manner.

As in an islanded microgrid without a central controller and/or without communication available between plants, no exchange of the total power demanded and the power to be supplied by the various plants is possible. And neither is the coordination of the power to be supplied by the various plants to match the total power demanded. Accordingly, instead of trying to exchange information regarding power demand and power supply, each local controller creates its' own information: an estimation of the total power demanded. As this is based on the same input, viz. the dynamic input of the frequency measured, this estimation though calculated at each local controller separately will more or less be the same in each controller.

From this estimation of total power demand, each local controller may estimate the power demanded that the respective plant may need to deliver. And as this is based on the same input, viz. the static input of type and size of each available plant, this estimation though calculated at each local controller separately will be consistent in each controller. This enables the matching of the power supplied together by both the renewable and generator plants to the total power demanded by the load.

The local controller of the at least one generator plant assumes that the renewable plant is capable of providing all the power corresponding to the total size of the plant. In order to correct this assumption, the change, i.e. decrease or increase, in frequency applied by the renewable plant controller is measured by the generator plant controller, which measurement influences the estimation of the demanded power load by the generator controller. And, hence, the estimation of the power demanded from the generator plant will change accordingly, which triggers the generator plant local controller to supply power to match the total power demanded by the load minus the power supplied by the renewable plant.

Further objects, aspects, effects and details of the invention are described in the following detailed description of a number of exemplary embodiments, with reference to the drawings.

BRIEF DESCRIPTION OF DRAWINGS

By way of example only, the embodiments of the present disclosure will be described with reference to the accompanying drawing, wherein.

DETAILED DESCRIPTION

Figure 2:
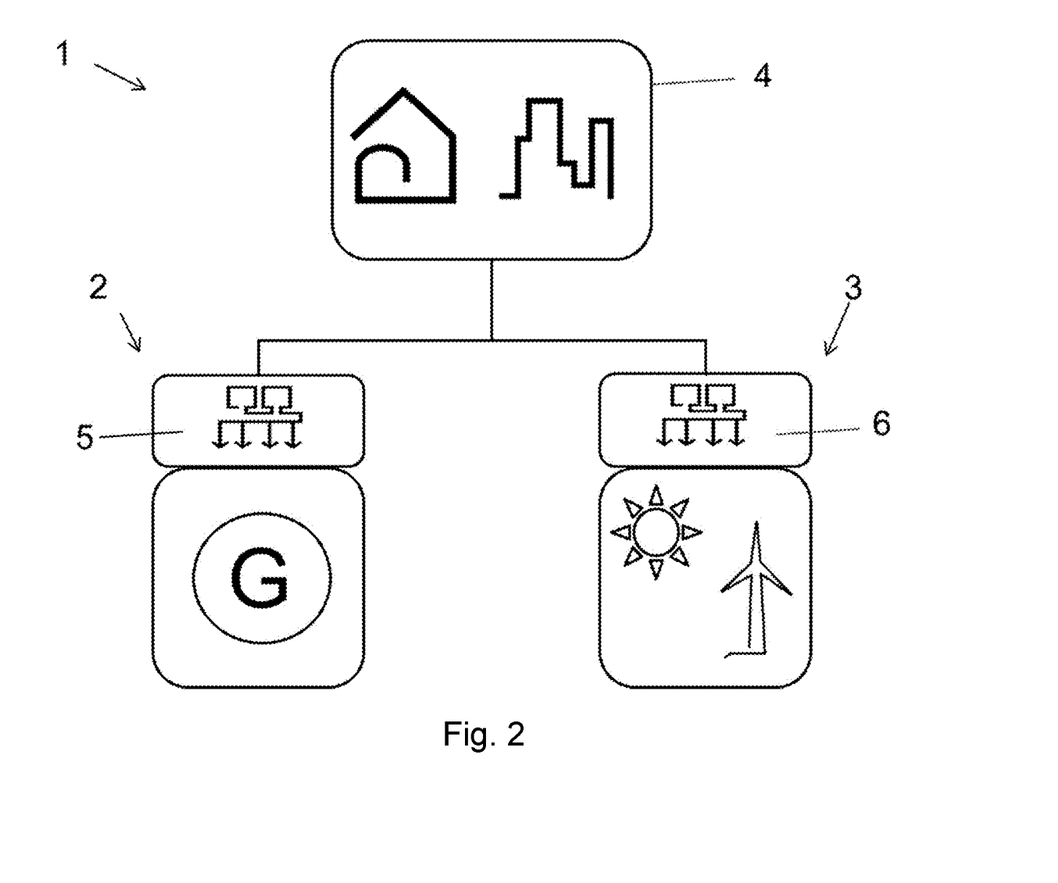
FIG. 2 illustrates schematically an example of a microgrid in accordance with the invention.

Referring to FIG. 2, a microgrid 1 is shown having an energy generator plant 2 and a renewable energy plant 3 which are configured to supply power to one or more loads 4 that are intended to consume, at least partly, a power delivered by the energy plants. In order to be electrically connected together, advantageously in parallel, to the microgrid 1, the various power plants 2, 3 must each be capable of delivering an electrical signal of the same frequency and the same voltage.

The generator plant may include various non-renewable energy resources, such as synchronous generators. Synchronous generators 2 generally comprise a synchronous motor (an alternator) that, when rotationally driven by a shaft of a rotating machine, generates an AC electrical signal (an electric current and a voltage). The rotating machine may comprise a diesel motor or a turbine such as e.g. a gas, water, steam or air turbine.

The renewable plant 3 may include one or more renewable energy resources, a power accumulation system and one or more inverters. The renewable energy resources may comprise solar power generators, wind power generators or water current power generators, which generally generate a DC electrical signal. There may be an inverter for each renewable resource, there may be one inverter for multiple renewable resources, or there may be one inverter for the whole plant combining all the contributions of all renewable resources. This may be chosen in dependence on whether there are different types of resources, the size of resources or other criteria. Regardless of the chosen configuration, the one or more inverters are capable of converting the electrical signal generated by the renewable energy resources to an AC electrical signal before it is injected into the microgrid 1.

Each plant has a local controller 5, 6 for controlling operation of the respective plant 2, 3. The local generator controller 5 of the generator plant controls the starting and stopping of the various non-renewable energy resources available within the generator plant 2, in order to match the power to be supplied to the power demanded by the load 4 and the power supplied by the renewable plant 3. The local renewable controller 6 of the renewable plant controls the power supplied by the renewable resources, with the aim to optimize the contribution of the renewable supplied power to the total power load demanded by the load 4. Furthermore, the internal control of the one or more inverters is arranged to implement a control law that enables operation of the renewable resources and the whole renewable plant 3 as a Virtual Generator.

Figure 3:
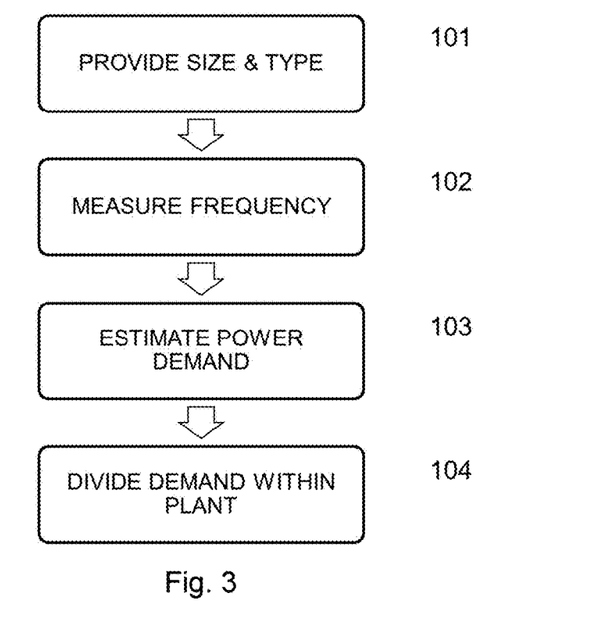
FIG. 3 is a flow diagram of an example of a method in accordance with the invention.

Turning to FIG. 3, an example of a method for controlling the operation of the microgrid of FIG. 2 is shown. In general, the method may be used for controlling any microgrid having at least one renewable plant of distributed renewable energy resources and at least one generator plant of distributed non-renewable energy resources, wherein each plant has a local controller:

The method includes providing 101 the type and the size of each plant 2, 3 connected within the microgrid 1 to the local controller 5, 6 of each other plant within the microgrid. This may be done during an initial phase during which the microgrid is installed and configured. The size of a plant indicates the total amount of power that may potentially be supplied by that plant. Each local controller 5, 6 measures 102 the frequency of the microgrid. Based on the measured frequency, and together with the type and size of each plant, each local controller estimates 103 the power load demanded from the respective plant. This estimated power load is then divided 104 among the energy resources available within the plant. These steps are common for each controller, regardless of the type of plant: generator or renewable.

Based on the estimated power load and the renewable power supplied by the renewable plant 3, the local renewable controller 6 of the at least one renewable plant 3 can assess whether it is capable of supplying the total power demanded by the load or whether additional power is to be supplied by the generator plant 2. The renewable power supplied $P_{Renewable}$ may be sufficient, too little or too much, which is determined by comparing $P_{Renewable}$ with the estimated power load $P_{Estimated}$. In order to signal this the local renewable controller 6 may take advantage of its' Virtual Generator properties and adapt the frequency as it is capable of grid forming.

Figure 4:
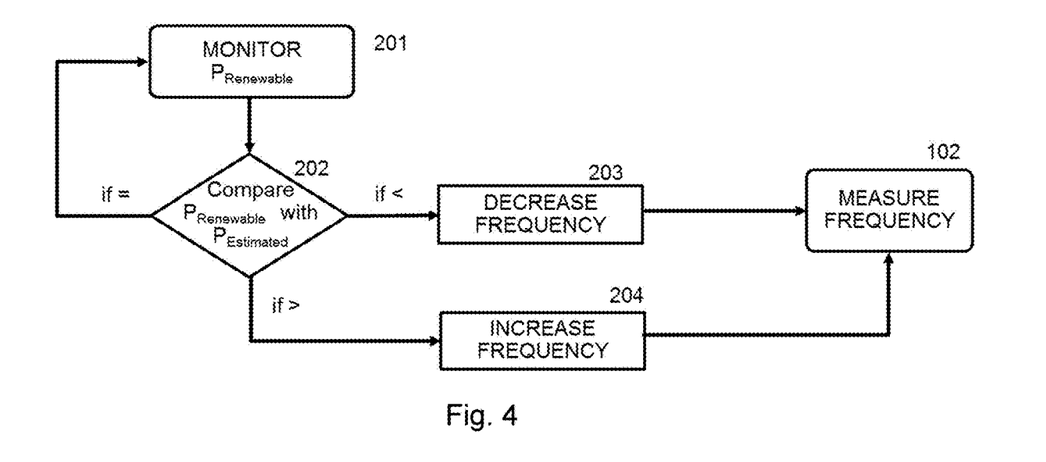
FIG. 4 is a further flow diagram of the method of FIG. 3.

Accordingly, as shown in FIG. 4, the method further includes the local renewable controller 6 decreasing 203 the frequency at which power is supplied by the renewable plant 3 when the supplied power falls below the estimated load. Which in this example is assessed by comparing 202 the renewable power supplied with the estimate of the power demanded by the load 4. And the local renewable controller 6 may increase 204 the frequency at which power is supplied by the renewable plant 3 when the supplied power exceeds the estimated load.

Figure 5:
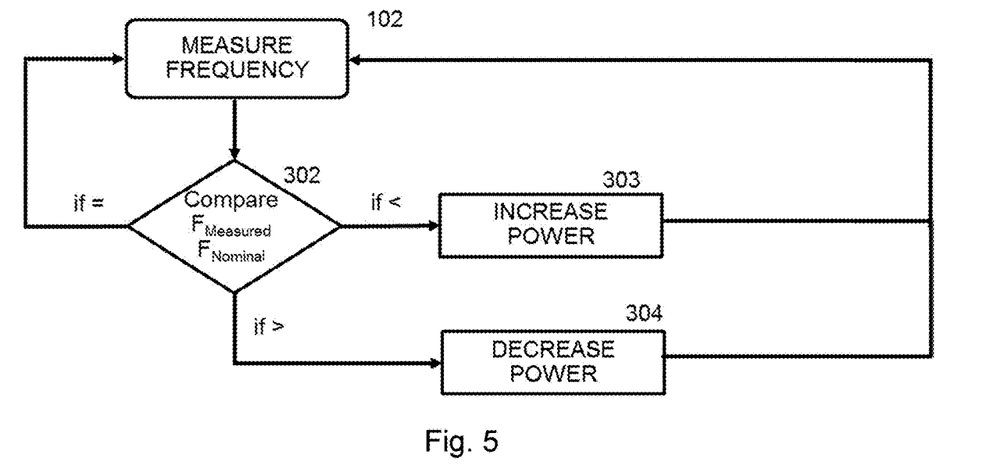
FIG. 5 is a further flow diagram of the method of FIG. 3.

In turn, as shown in FIG. 5, the local generator controller 5 of the at least one generator plant 2, which measures 102 the frequency of the microgrid, will detect a drop or rise of the frequency, in this example by comparing the measured frequency $F_{Measured}$ with the nominal or desired value of the frequency $F_{Nominal}$. In response thereto, the local generator controller 5 may increase 303 the power supply by non-renewable resources in response to detecting a decrease in frequency of the microgrid. And the local generator controller 5 may decrease 304 power supply by non-renewable resources in response to detecting an increase in frequency of the microgrid. More in particular, the power demand estimated 103 by the local generator controller 5 will provide an indication of the amount of power by which the local generator 6 needs to adapt the power that is supplied by the generator plant 2.

As a generator plant 2 in general is also capable of grid forming, a drop or rise in frequency of the microgrid due to the decrease or increase dictated by the local renewable controller 6, will be compensated by the frequency of the adapted power supplied by the generator plant 2 which is enacted by the response of generator controller 5. A drop in microgrid frequency due to a reduction in frequency of the contribution of the renewable plant will be offset through superposition of the frequency of the generator power due to an increase of the contribution of the power supplied by the generator plant 2.

In another example of a method for controlling the operation of the microgrid 1, wherein the at least one renewable plant includes a local energy accumulator, the method may take in account the state of charge of that energy accumulator. Shown in FIG. 6, similarly to the example of FIG. 4, the method includes the local renewable controller 6 comparing 402 the renewable power supplied with the estimate of the power demanded by the load 4. And the local renewable controller 6 may increase 404 the frequency at which power is supplied by the renewable plant 3 when the supplied power exceeds the estimated load.

Figure 6:
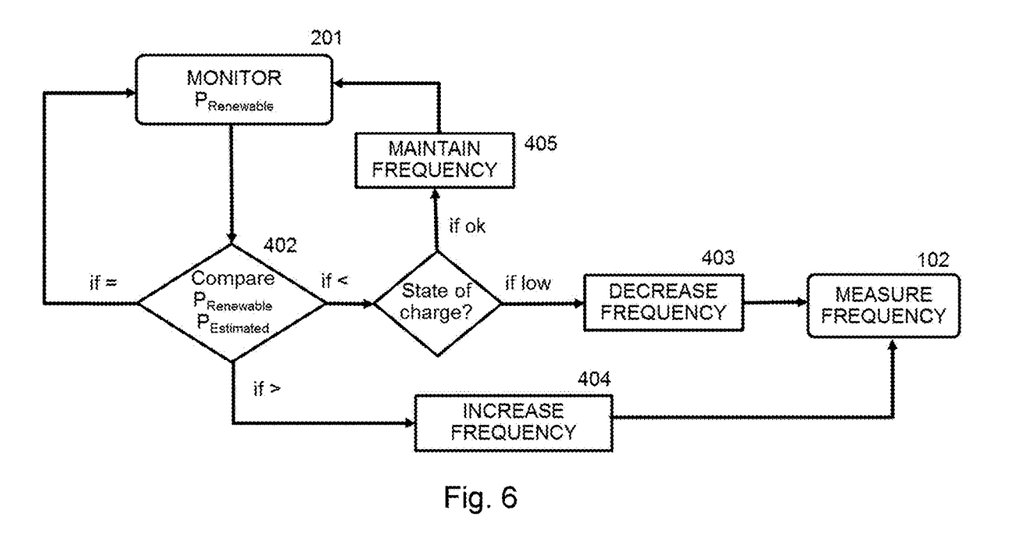
FIG. 6 is a flow diagram of another example of a method in accordance with the invention.

In the example of FIG. 6, the method further includes the local controller 6 of the at least one renewable plant 3, when the state of charge of the local energy accumulator is sufficient to ensure reserve power, maintaining 405 the frequency at which power is supplied by the renewable plant 3 when the supplied energy falls below the estimated load. And the renewable controller 6 initiates and/or actively controls discharging of the local energy accumulator. Hence, additional power from the generator plant 2 is not yet required as the amount of power supplied by the renewable plant 3 may be kept at the desired level. For which the renewable controller 6 will continue to monitor 201 the renewable power. On the other hand, when the state of charge of the local energy accumulator is insufficient to ensure reserve power, the renewable controller 6 decreases 403 the frequency at which power is supplied by the renewable plant when the supplied energy falls below the estimated load.

Furthermore, when the renewable controller 6 assesses that the supplied power exceeds the estimated power demanded, the controller may also, initiate charging of the local energy accumulator. Various schemes for optimizing charging may be considered. For example, the charging of the energy accumulator may be initiated prior to increasing the frequency 404, to ensure a fully charged energy accumulator before the generator plant starts supplying power. As another example, the charging of the energy accumulator may be initiated instead of increasing the frequency, e.g. in the event that it is expected that the excess provided power will drop again before the energy accumulator is charged to full capacity. Or the charging of the energy accumulator may be initiated simultaneously with increasing 404 the frequency, e.g. when a continuous rise in power supply is expected at daybreak or a positive weather forecast for a solar panel is considered.

In order to control the frequency of the electrical signal supplying renewable power, the controller 6 of the renewable plant 3 is arranged for controlling a setpoint; which setpoint regulates the frequency at which power is supplied. And the renewable controller 6 adjusting the setpoint for either decreasing or increasing the frequency at which power is supplied by the renewable plant when the supplied power respectively falls below or exceeds the estimated load.

As a more specific example, the local controller 6 of the renewable plant 3 is arranged for implementing and/or enforcing a control law that enables droop control. Droop control relates to the adjustment of frequency of the electrical signal as a function of the active power supplied and/or adjustment of the voltage of the electrical signal as a function of the reactive power: The setpoint controlled by the renewable controller 6 is then a power setpoint i.e. power reference that according to the relationship between active power and frequency defined by the control law adapts the frequency of the renewable power being supplied.

In order for each local controller 5, 6 to obtain an estimate of the total power demanded and determine therefrom the power it may need to supply, each local controller 5, 6 performs an identical algorithm. As one example of such an algorithm, estimating the power load demanded from the plant based on the measured frequency, and the type and size of each plant, includes solving the following set of differential equations:

$$P_{est} = S(\lambda(f-f_0)+z)$$

$$\dot{z} = \lambda_f(P_{est} - z)$$

Herein the following parameters are used:
S is a saturation function;
$\lambda$ and $\lambda_f$ are tunable control variables;
f is the measured frequency;
$f_0$ is a nominal frequency;
z is an integrator variable; and
$\dot{z}$ is the time derivative of z.

This set of equation implements a saturated Proportional Integrator Controller (PI-controller). The saturation function is chosen such that it is avoided that the estimated power exceeds the microgrid size. Values of the control variables $\lambda$ and $\lambda_f$ depend on the size of the microgrid. For example, for a small microgrid of some kW values will be in the order of $\lambda=150$ and $\lambda_f=5$. Whereas for a microgrid of several MW, $\lambda=1500$ and $\lambda_f=50$. The nominal frequency $f_0$ is preferably 50 Hz, but may be chosen freely for other purposes.

The variable Z is an internal variable, which is only used for the calculation and allows to "save" the value of the estimated power. Accordingly, when $f=f_0$, then $P_{est}=S(z)$. Here the integrator is also accentuated by the control variable $\lambda_f$ to accelerate the convergence of $P_{est}$. At the start of the calculations the initial value of $P_{est}$ may be set to zero.

Furthermore, estimating the power demanded by the plant includes comparing the estimated power load with the size of the at least one renewable plant for determining whether the renewable power supplied matches the total power demanded.

In order to obtain the estimate of the power demanded by the respective plant, estimating the power load demanded from the plant based on the measured frequency, and the type and size of each plant, further includes the following.

When the estimated total power demand is less than the size of the renewable plant, the power demanded by the renewable plant is set equal to the total power demanded. And the power demanded by the generator plant is set at zero. Or represented in a formula:

$$P_{Renewable} = P_{est}$$

$$P_{GenSet} = 0$$

And when the estimated total power demand is more than the size of the renewable plant, the power demanded by the renewable plant is set equal to the size of the renewable plant. And the power demanded by the generator plant is set equal to the total power demanded minus the size of the renewable plant. Or represented in a formula:

$$P_{Renewable} = Size_{Renewable}$$

$$P_{GenSet} = P_{est} - Size_{Renewable}$$

It is important to note that the estimate of the total power demanded is not necessarily the actual power demanded. It is a parameter that is estimated i.e. calculated to communicate the power that needs to be supplied by the generator plant. As this may be calculated as the difference between the power that the renewable plant is able to supply and the total power that is demanded from the microgrid, it is not required to communicate the actual power that the renewable plant is able to supply. Instead the power excess demanded is communicated, being the estimated total power minus the fixed size of the plant.

Figure 7:
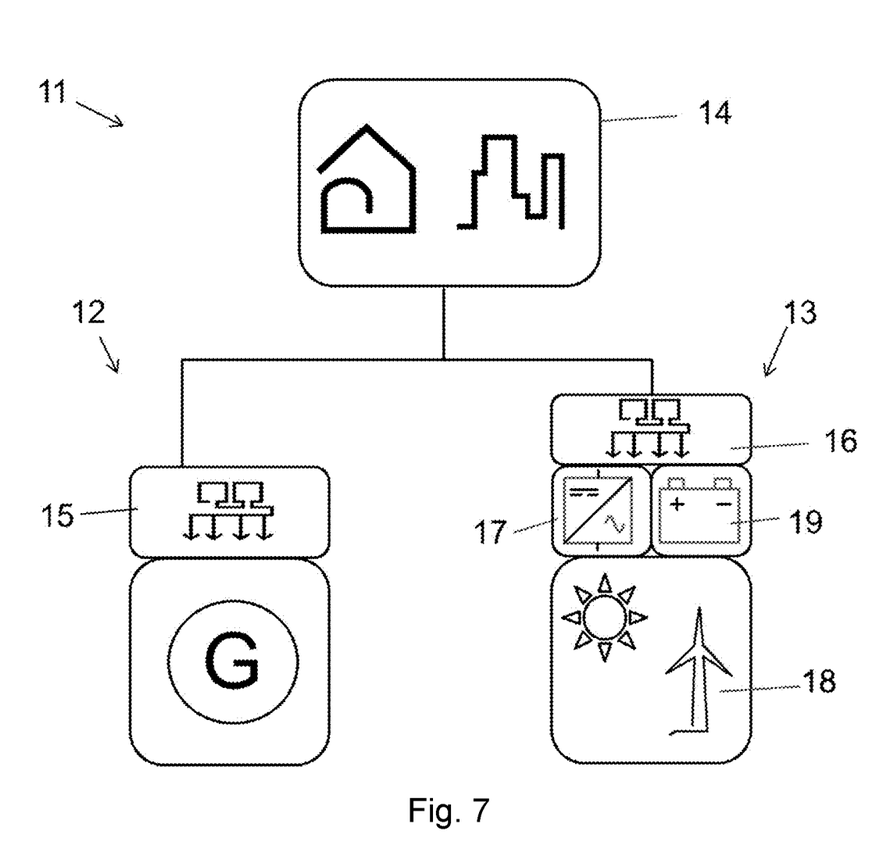
FIG. 7 illustrates schematically another example of a microgrid in accordance with the invention.

The various examples of methods for controlling operation of a microgrid as disclosed herein, may be implemented accordingly in such a microgrid. Referring to FIG. 7, a microgrid 11 is shown having at least one energy generator plant 12 and at least one renewable energy plant 13 which are configured to supply power to one or more loads 14. The at least one renewable plant 13 has one or more distributed renewable energy resources 18, a renewable inverter 17 and a local renewable controller 16. The at least one generator plant 12 includes one or more distributed non-renewable energy resources and a local generator controller 15.

Each local controller 15, 16 is provided with the type and size of all the other plants present within the microgrid 11. Each local controller 15, 16 is arranged for measuring the frequency of the microgrid. Each local controller 15, 16 is arranged for estimating the power load demanded from the plant based on the measured frequency, and the type and size of each plant. And each local controller 15, 16 is arranged for dividing the estimated power load among the energy resources available within the respective plant 15, 16.

The local controller 16 of the at least one renewable plant 13 is further arranged for monitoring the power supplied by the plant, for decreasing the frequency at which power is supplied by the renewable plant when the supplied power falls below the estimated load, and arranged for increasing the frequency at which power is supplied by the renewable plant when the supplied power exceeds the estimated load.

The local controller 15 of the at least one generator plant 12 is further arranged for increasing power supply by non-renewable resources in response to detecting a decrease in frequency of the microgrid, and arranged for decreasing power supply by non-renewable resources in response to detecting an increase in frequency of the microgrid.

Furthermore, the at least one renewable plant 13 has a local energy accumulator 19. Hence, the local controller 16 of the at least one renewable plant 13 is further arranged for, when the state of charge of the local energy accumulator is sufficient to ensure reserve power, maintaining the frequency at which power is supplied by the renewable plant when the supplied energy falls below the estimated load and for controlling discharging of the local energy accumulator 19. And the renewable controller 16 is further arranged for, when the state of charge of the local energy accumulator is insufficient to ensure reserve power, decreasing the frequency at which power is supplied by the renewable plant when the supplied energy falls below the estimated load.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for controlling a microgrid comprising at least one renewable plant of distributed renewable energy resources and at least one generator plant of distributed non-renewable energy resources, each plant having a local controller, comprising:
   providing type and size of each plant to the local controller of each plant within the microgrid;
   each respective local controller of the at least one renewable plant and the at least one generator plant performing:
      measuring the frequency of the microgrid;
      estimating the power load demanded from the plant of the respective local controller based on the measured frequency, and the type and size of each plant in the microgrid; and
      dividing the estimated power load among the energy resources available within the plant of the respective local controller;
   the local controller of the at least one renewable plant performing:
      monitoring the power supplied by the at least one renewable plant;
      decreasing the frequency at which power is supplied by the at least one renewable plant when the supplied power falls below the estimated load; and
      increasing the frequency at which power is supplied by the at least one renewable plant when the supplied power exceeds the estimated load;
   the local controller of the at least one generator plant performing:

increasing power supply by non-renewable resources in response to detecting a decrease in frequency of the microgrid; and decreasing power supply by non-renewable resources in response to detecting an increase in frequency of the microgrid.

2. The method according to claim 1, wherein at least one renewable plant comprises a local energy accumulator, the method further comprising:

the local controller of the at least one renewable plant performing:

when the state of charge of the local energy accumulator is sufficient to ensure reserve power:

maintaining the frequency at which power is supplied by the at least one renewable plant when the supplied power falls below the estimated load; and controlling discharging of the local energy accumulator;

when the state of charge of the local energy accumulator is insufficient to ensure reserve power:

decreasing the frequency at which power is supplied by the at least one renewable plant when the supplied power falls below the estimated load.

3. The method according to claim 1, further comprising:

the local controller of the at least one renewable plant, when the supplied power exceeds the estimated load, initiating charging of the local energy accumulator;

wherein initiating charging may be performed prior to, instead of, or simultaneously with increasing the frequency.

4. The method according to claim 1, further comprising:

the local controller of the at least one renewable plant performing:

controlling a setpoint, the setpoint regulating the frequency at which power is supplied;

adjusting the setpoint power for either decreasing or increasing the frequency at which power is supplied by the renewable plant when the supplied power respectively falls below or exceeds the estimated load.

5. The method according to claim 1, further comprising:

the local controller of the at least one generator plant performing:

controlling starting and stopping operation of each respective non-renewable energy source.

6. The method according to claim 1, further comprising:

the local controller of the at least one renewable plant implementing a control law, the control law comprising droop control.

7. The method according to claim 1, wherein estimating the power load demanded from the plant of the respective local controller based on the measured frequency, and the type and size of each plant, comprises:

solving the following set of differential equations:

$$P_{est}=S(\lambda(f-f_0)+z)$$

$$\dot{z}=\lambda_f(P_{est}-z)$$

wherein:
S is a saturation function;
$\lambda$ and $\lambda_f$ are tunable control variables;
f is the measured frequency;
$f_0$ is a nominal frequency;
z is an integrator variable;
$\dot{z}$ is a time derivative of z; and comparing the estimated power load with the size of the at least one renewable plant for determining whether the renewable power supplied is sufficient to match the total power demanded.

8. The method according to claim 1, wherein estimating the power load demanded from the plant of the respective local controller based on the measured frequency, and the type and size of each plant, further comprises:

when the estimated total power demand is less than the size of the renewable plant:

setting the power demanded by the renewable plant equal to the total power demanded;

setting the power demanded by the generator plant at zero;

when the estimated total power demand is more than the size of the renewable plant;

setting the power demanded by the renewable plant equal to the size of the renewable plant;

setting the power demanded by the generator plant equal to the total power demanded minus the size of the renewable plant.

9. A microgrid comprising:

at least one renewable plant comprising one or more distributed renewable energy resources, a renewable inverter and a local renewable controller;

at least one generator plant comprising one or more distributed non-renewable energy resources and a local generator controller;

wherein each local controller is provided with the type and size of all plants in the microgrid;

wherein each local controller of the at least one renewable plant and the at least one generator plant is configured to perform:

measuring the frequency of the microgrid;

estimating the power load demanded from the plant of the respective local controller based on the measured frequency, and the type and size of each plant in the microgrid; and dividing the estimated power load among the energy resources available within the plant of the respective local controller;

wherein the local controller of the at least one renewable plant is further configured to perform:

monitoring the power supplied by the at least one renewable plant;

decreasing the frequency at which power is supplied by the at least one renewable plant when the supplied power falls below the estimated load; and increasing the frequency at which power is supplied by the at least one renewable plant when the supplied power exceeds the estimated load;

wherein the local controller of the at least one generator plant is further configured to perform:

increasing power supply by non-renewable resources in response to detecting a decrease in frequency of the microgrid; and decreasing power supply by non-renewable resources in response to detecting an increase in frequency of the microgrid.

10. The microgrid according to claim 9, wherein the at least one renewable plant further comprises a local energy accumulator;

wherein the local controller of the at least one renewable plant is further configured to perform:

when the state of charge of the local energy accumulator is sufficient to ensure reserve power:

maintaining the frequency at which power is supplied by the at least one renewable plant when the supplied energy falls below the estimated load; and
controlling discharging of the local energy accumulator;
when the state of charge of the local energy accumulator is insufficient to ensure reserve power:
decreasing the frequency at which power is supplied by the at least one renewable plant when the supplied energy falls below the estimated load.

* * * * *